(12) United States Patent
Leibner et al.

(10) Patent No.: US 11,143,764 B2
(45) Date of Patent: *Oct. 12, 2021

(54) DETECTING TIMING ANOMALIES (71) Applicant: The MITRE Corporation, McLean, VA (US)

(72) Inventors: Darrow Paine Leibner, Arlington, VA (US); Alessandro Paolo Cerruti, Winchester, MA (US)

(73) Assignee: The MITRE Corporation, McLean, VA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/653,156

(22) Filed: Oct. 15, 2019

(65) Prior Publication Data

US 2020/0049834 A1 Feb. 13, 2020

Related U.S. Application Data

(63) Continuation of application No. 15/402,715, filed on Jan. 10, 2017, now Pat. No. 10,444,372, which is a
(Continued)

(51) Int. Cl.
*G01S 19/21* (2010.01)
*H04K 3/00* (2006.01)
*H04L 29/06* (2006.01)

(52) U.S. Cl.
CPC ............ *G01S 19/215* (2013.01); *H04K 3/22* (2013.01); *H04K 3/65* (2013.01); *H04L 63/1483* (2013.01); *H04K 3/90* (2013.01)

(58) Field of Classification Search
CPC ..... G01S 19/215; H04L 63/1483; H04K 3/22; H04K 3/65; H04K 3/90
(Continued)

(56) References Cited

U.S. PATENT DOCUMENTS 4,392,226 A 7/1983 Cook
7,952,519 B1 5/2011 Nielsen et al.
(Continued)

FOREIGN PATENT DOCUMENTS

EP 1 489 432 B1 5/2008
EP 2 280 485 A1 2/2011
WO WO 2013/043851 A1 3/2013

OTHER PUBLICATIONS

International Search Report and Preliminary Report on Patentability directed to related International Patent Application No. PCT/US2014/032691, dated Aug. 29, 2014; 11 pages.
(Continued)

*Primary Examiner* — Erin F Heard
*Assistant Examiner* — Donald H B Braswell
(74) *Attorney, Agent, or Firm* — Sterne, Kessler, Goldstein & Fox P.L.L.C.

(57) ABSTRACT

Disclosed herein are system, method, and computer program product embodiments for adapting to malware activity on a compromised computer system by detecting timing anomalies between timing signals. An embodiment operates by analyzing first timing data accessed from a validated source and second timing data accessed from an unvalidated receiver source in order to compute a threat detection value, which is utilized to determine if there is a discrepancy or anomaly in the timing or frequency of either the validated and unvalidated sources.

20 Claims, 5 Drawing Sheets

Related U.S. Application Data continuation of application No. 13/875,672, filed on May 2, 2013, now Pat. No. 9,541,649.

(58) Field of Classification Search
USPC .................................................. 342/357.59
See application file for complete search history.

(56) References Cited

U.S. PATENT DOCUMENTS

| | | | |
|---|---|---|---|
| 8,125,381 | B2 | 2/2012 | Bryant et al. |
| 8,149,163 | B2 | 4/2012 | Toda |
| 8,159,391 | B2 | 4/2012 | Papadimitratos et al. |
| 8,253,624 | B2 | 8/2012 | King et al. |
| 8,368,591 | B2 | 2/2013 | Talbot et al. |
| 8,675,713 | B2 | 3/2014 | Martin et al. |
| 9,541,649 | B2 * | 1/2017 | Leibner ............... H04L 63/1483 |
| 10,444,372 | B2 * | 10/2019 | Leibner .................. H04K 3/65 |
| 2004/0132421 | A1 | 7/2004 | Underbrink |
| 2007/0285309 | A1 | 12/2007 | Atkinson |
| 2009/0034672 | A1 * | 2/2009 | Cho ...................... H04J 3/0697 375/364 |
| 2009/0069960 | A1 | 3/2009 | Lapp et al. |
| 2009/0257321 | A1 | 10/2009 | Scott et al. |
| 2010/0123627 | A1 | 5/2010 | Reynolds et al. |
| 2011/0102259 | A1 | 5/2011 | Ledvina et al. |
| 2011/0181466 | A1 | 7/2011 | Serrano et al. |
| 2011/0285586 | A1 | 11/2011 | Ferguson |
| 2012/0041620 | A1 | 2/2012 | Stayton et al. |
| 2012/0050098 | A1 | 3/2012 | Kuehnel et al. |
| 2013/0002477 | A1 | 1/2013 | Dehnie et al. |
| 2014/0327573 | A1 | 11/2014 | Leibner et al. |
| 2015/0226858 | A1 | 8/2015 | Leibner et al. |
| 2017/0146665 | A1 | 5/2017 | Leibner et al. |

OTHER PUBLICATIONS

Dana, P., "Global Positioning System (GPS) Time Dissemination for Real-time Applications," Real-Time Systems, 12, 1997; pp. 9-40.

Wang, W., "GPS-Based Time & Phase Synchronization Processing for Distributed SAR," IEEE Transactions on Aerospace and Electronic Systems, vol. 45, No. 3, Jul. 2009; pp. 1040-1051.

Bull, et al., "A Power-Efficient 32 bit ARM Processor Using Timing-Error Detection and Correction for Transient-Error Tolerance and Adaptation to PVT Variation," IEEE Journal of Solid-State Circuits, vol. 46, No. 1, Jan. 2011; pp. 18-31.

Mosavi, M.R. et al., "Use of Accurate GPS Timing based on Radial Basis Probabilistic Neural Network in Electric Systems," IEEE, 2010 International Conference on Electrical and Control Engineering, pp. 2572-2575 (2010).

Vyskočil, P. and Šebesta, J., "Relative Timing Characteristics of GPS Timing Modules for Time Synchronization Application," IEEE, IWSSC 2009, 5 pages (2009).

Warner, J.S. and Johnston, R.G., "GPS Spoofing Countermeasures," Homeland Security Journal, 7 pages (Dec. 12, 2003).

Wesson, K. D. et al., "A Combined Symmetric Difference and Power Monitoring GNSS Anti-Spoofing Technique," Preprint of the 2013 IEEE Global Conference on Signal and Information Processing (GlobalSIP), Austin, TX, 4 pages (Dec. 3-5, 2013).

Zhang, Z. et al., "Time Synchronization Attack in Smart Grid—Part II: Cross Layer Detection Mechanism," IEEE, IEEE Transaction on Smart Grid, 8 pages (Apr. 2, 2012).

* cited by examiner

DETECTING TIMING ANOMALIES

CROSS-REFERENCE TO RELATED APPLICATION

This application is a continuation of U.S. Nonprovisional patent application Ser. No. 15/402,715, filed Jan. 10, 2017, titled "Detecting Timing Anomalies," which is a continuation of U.S. Nonprovisional patent application Ser. No. 13/875,672, filed May 2, 2013, which is patented as U.S. Pat. No. 9,541,649 and also entitled "Detecting Timing Anomalies," all of which are hereby incorporated herein by reference in their entireties.

BACKGROUND

Background

Digital systems rely on timing subsystems in order to operate properly. Such timing subsystems are vulnerable to timing anomalies, which are difficult to detect.

When dealing with network security including digital systems, timing anomalies can be the result of a spoofing attack. A spoofing attack is a technique used by a hacker or attacker to masquerade or falsify data, unknown to users of the digital system.

A GNNS spoofing attack involves an attempt by a hacker to trick a GNNS receiver, such as a GPS receiver, by broadcasting a signal which is different than the signals received from GPS satellites. The broadcasted signals are designed to appear as normal or standard GPS signals. However, the spoofed signals are modified in such a manner to cause the GPS receiver to produce bad time or timing intervals and/or produce a position at a location determined by the attacker, as opposed to the actual UTC time or the receiver's actual location. Thus, the goal of spoofing in this example is to provide a GPS receiver with a misleading signal and therefore deceive the receiver to use fake signals for positioning and timing calculations, which will not be accurate.

The reliance on GPS within civil infrastructure is an inherent security vulnerability.

Individuals, groups, or nations interested in causing harm can target a GPS reliant system, thereby disrupting or disabling swaths of infrastructure including national critical infrastructure such as the financial and power industries, as well as cellular communication systems and automated teller machines (ATMs). In particular, the concern over GPS spoofing, an insidious form of intentional interference whereby a spoofer transmits counterfeit GPS signals to an unsuspecting (and unprotected) receiver. Spoofing is more malignant than jamming, because current civil receivers trust all GPS signals to be true, and therefore cannot warn the user, much less take evasive action, when confronted with counterfeit signals.

While the GPS P-code is heavily encrypted and thus, is hard to spoof, the civilian GPS signal, the C/A code, is relatively easy to spoof because the signal structure, the spread spectrum codes, and modulation methods are open to the public. Insecure civil GPS technology has recently been utilized by critical systems, such as military vehicles, communications systems, banking and finance institutions and the power grid. Consequently, these systems can be severely compromised when subject to a spoofing attack resulting in positioning or timing anomalies.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for detecting timing anomalies within systems, such as but not limited to digital systems.

Figure 1:
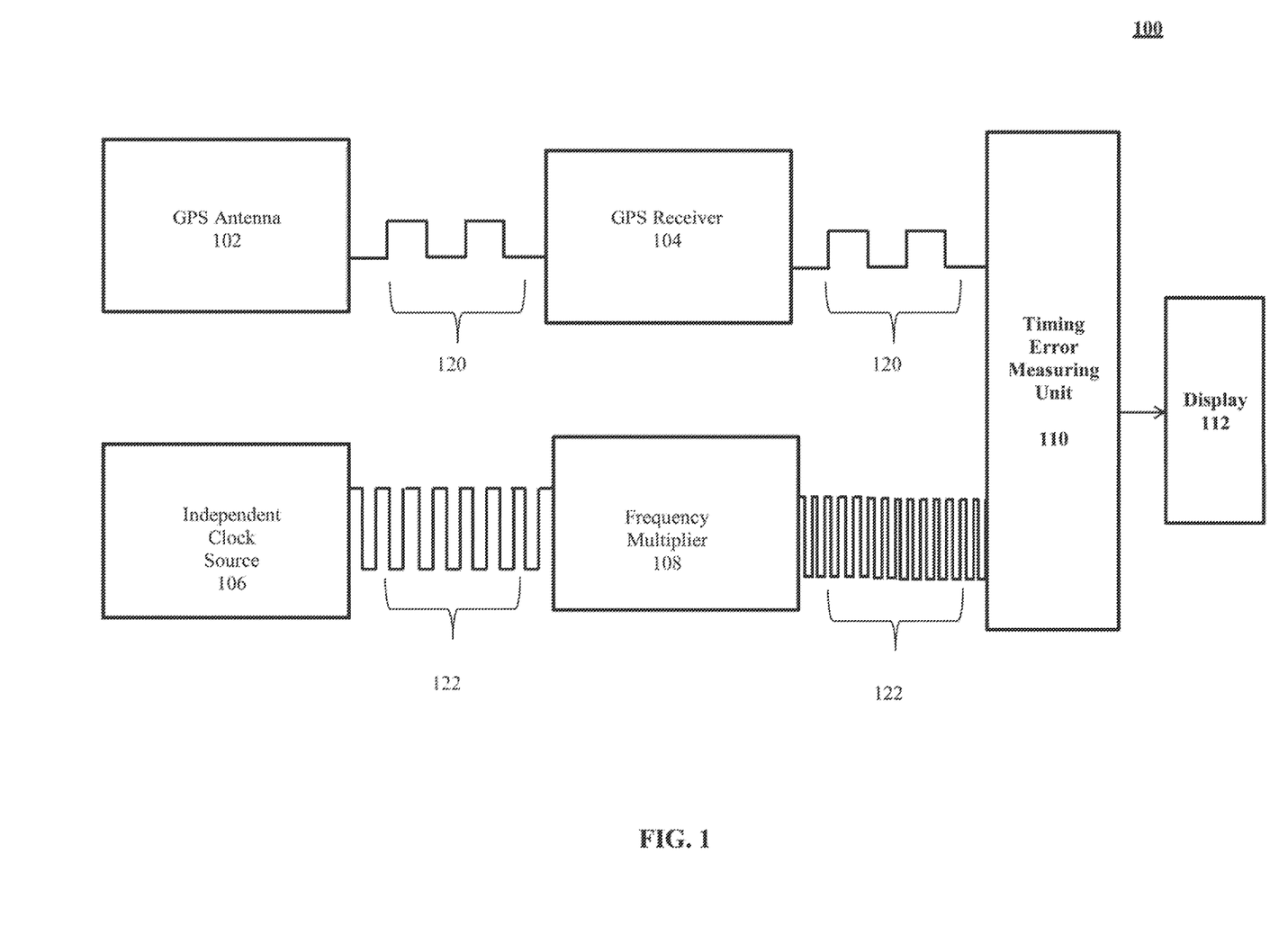
FIG. 1 is a block diagram of a timing analysis detection system, according to an example embodiment.

FIG. 1 is a block diagram illustrating a timing analysis detection system 100, which provides real-time protection of timing-based digital systems, according to an embodiment. Timing anomaly detection system includes a GPS antenna 102, a GPS receiver 104, an independent clock source 106 (e.g. atomic frequency standard, crystal oscillator, non GNSS-derived satellite time, PTP, etc), a frequency multiplier 108, a timing error measuring unit 110 and a display 112. Although embodiments are discussed below using a cesium-based clock, one of ordinary skill in the art will understand and appreciate that embodiments are not limited to cesium and any clock source may be used.

In an embodiment, timing anomaly detection system 100 operates as follows. Timing error measuring unit 110 is configured to process first data accessed from a validated source, such as independent clock source 106. Additionally, timing error measuring unit 110 is configured to process second data accessed from an unvalidated data source, such as GPS receiver 104. Independent clock source 106 can be a cesium clock, for example. A cesium clock is a clock device that uses an internal resonance frequency of atoms (or molecules) to measure the passage of time. That is, independent clock source 106 is controlled by atomic or molecular oscillations. Independent clock source 106 utilizes an electronic transition frequency in the microwave region of the electromagnetic spectrum of atoms as a frequency standard for timekeeping purposes. The actual time-reference of independent clock source 106 includes an electronic oscillator operating at microwave frequency. The oscillator is configured such that its frequency-determining components include an element that can be controlled by a feedback signal. The feedback signal keeps the oscillator tuned in resonance with the frequency of the electronic transition of cesium. Currently, the correct frequency for the particular cesium resonance is defined by international agreement as 9,192,631,770 Hz so that when divided by this number the output is exactly 1 Hz, or 1 cycle per second. According to embodiments, independent clock source 106 is considered a validated source, because cesium clocks are accurate time and frequency standards known and serve as a standard for the definition of the second in SI (the atomic second). Cesium clocks are used as standards for international time distribution services, to control the wave frequency in a global navigation satellite system such as GPS.

GPS receiver 104 is configured to measure the relative time delay of signals from a plurality of GPS satellites or antennas 102. In general, the plurality of GPS antennas 102 can each include onboard cesium atomic clocks. The relative time delay of signals are transformed into absolute spatial coordinates and a time coordinate by GPS receiver 104. GPS receiver 104 is an unvalidated data source, because, as previously discussed, GPS receiver 104 can be compromised by a targeted attack, such as a spoofing attack. Such an attack can attempt to modify the time coordinate, for example, which can result in inaccurate timing signals from GPS receiver 104. Embodiments are aimed at detecting such inaccuracies and generating corresponding alerts to a network operator. In an embodiment, GPS receiver 104 and independent clock source 106 are independent of each other. That is, the operation of these two data sources are essentially mutually exclusive. While embodiments herein are described using a GPS antenna and GPS receiver, persons of ordinary skill in the art will appreciate that any Global Navigation Satellite System (GNSS) may be utilized as the unvalidated data source.

A GPS receiver 104 outputs one pulse per second (PPS) timing signals 120, which are transmitted to timing error measuring unit 110. Independent clock source 106 is configured to generate 10 MHz timing signals 122 to frequency multiplier 108, which multiplies timing signals 122 by a constant, such as the value 10, and transmits the timing signals to timing error measuring unit 110. The frequency multiplier is not strictly necessary but may convert the timing signal from independent clock source 106 to a signal that is easier to process in timing error measuring unit 110. In an embodiment, timing error measuring unit 110 is configured to analyze timing signal 122 for an adjustable interval of time to determine a threat detection value. The interval of time can be a one second interval defined by consecutive 1 PPS leading-edges generated by GPS receiver 104, according to an embodiment. In an embodiment, timing error measuring unit 110 is configured to initiate a cycle counter. The cycle counter is configured to count the amount of cycles received from independent clock source 106 during the adjustable interval of time. For example, as discussed above, the adjustable interval of time can be configured to be one second intervals. During continuous one second intervals, timing error measuring unit 110 is configured to count the number of timing pulses generated by independent clock source 106. In an embodiment, timing error measuring unit 110 is configured to detect a pulse per second (PPS) received from GPS 104 and the cycle counter is configured to be latched to the leading edge of the detected PPS. Therefore, the counter is configured to register and record a count of the number of cycles received from independent clock source 106 each time a PPS is detected from GPS receiver 104. In this way, the counter is configured to be reset when a new count is initiated.

Analysis of timing signals 122 during 1 PPS intervals are used to compute a threat detection value, according to an embodiment. A threat detection value is utilized to determine if there is a discrepancy or anomaly in the timing or frequency of either independent clock source 106 or GPS receiver 104. In an embodiment, the threat detection value is computed based on a comparison between the determined quantity of cycles received from independent clock source 106 during an interval of time and a predetermined expected clock cycle value. For example, if the timing signals of independent clock source 106 and GPS receiver 104 are completely synchronized with no timing anomalies or discrepancies, the predetermined expected clock cycle can be 100,000,000. That is, during any 1 second interval defined by a 1 PPS from GPS receiver 104, timing error measuring unit 110 expects to receive or count 100 million pulses from independent clock source 106. Thus, in an embodiment, the predetermined expected clock cycle value represents an advantageous state of timing anomaly detection system 100 during operation. Any deviations from the expected clock cycle value would generate a delta which may be an indication that there is an anomaly in the timing of either the independent clock source 106 (not likely) or the GPS receiver 104, which is the more likely scenario.

In an embodiment, based on the delta between the determined quantity of cycles of independent clock source 106 and the predetermined expected clock cycle value, the threat detection value is set. The threat detection value is assigned the absolute value of the delta, according to embodiments. Thus, in the example described above, if GPS receiver 104 and independent clock source 106 are completely synchronized, timing error measuring unit 110 would compute a threat detection value of 0, indicating ideal operating and timing conditions within timing anomaly detection system 100. In an embodiment, the threat detection value is compared with a configurable threat detection threshold. Such a comparison is utilized to determine to what extent the timing signals of GPS receiver 104 and independent clock source 106 are out of sync. The threat detection threshold takes into account minor noise that may affect the timing signal of GPS receiver 104 in order to determine a range of acceptable timing signals. For example, the configurable threat detection threshold can be set to a value of 2. Therefore any threat detection value that meets or exceeds the threat detection value of 2, would serve as indicator that there is a significant disparity between the timing signals of GPS receiver 104 and independent clock source 106. Thus, in the example described above, if the cycle counter registers a count of 100,000,002 pulses received from independent clock source 106 during a 1 second interval, the computed threat detection value would be 2. That is, the count of 100,000,0002 pulses received from independent clock source 106 is compared with the predetermined expected clock cycle value of 100,000,000 to generate a delta of 2. The absolute value of the delta is then assigned to the threat detection value. In this scenario, timing error measuring unit 110 is configured to determine that the threat detection value of 2 meets the configurable threat detection threshold of 2. When this occurs, timing error measuring unit 110 is configured to generate an alert or message to a network operator, via display 112, to indicate that there is a discrepancy between the timing signals of GPS receiver 104 and independent clock source 106. In this way, a network operator is provided real-time information regarding the timing characteristics of timing anomaly detection system 100 and is immediately alerted to discrepancies or timing anomalies, which may serve as an indicator of a compromised system or network.

Figure 2:
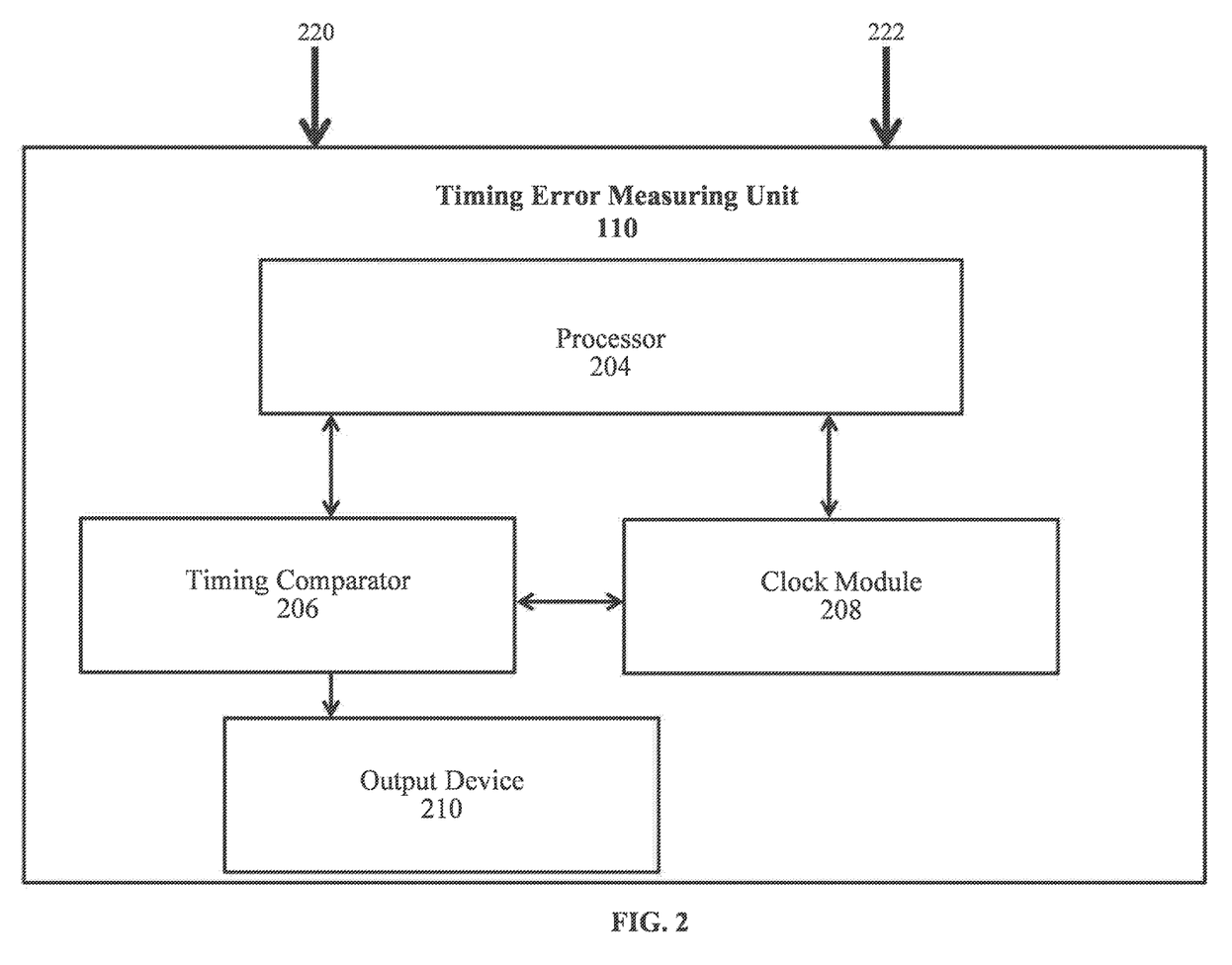
FIG. 2 is a block diagram of a timing error measuring unit, according to an example embodiment.

FIG. 2 is a block diagram of a timing error measuring unit, according to an example embodiment. Timing error measuring unit 110 includes a processor 204, a timing comparator 206, clock module 208 and an output device 210.

Timing error measuring unit 110 can be software, firmware, or hardware or any combination thereof in a computing device. Timing error measuring unit 110 can be implemented on or implemented with one or more client computing devices. A client computing device can be any type of computing device having one or more processors and memory. For example, a client computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A client computing device may include a communication port or I/O device for communicating over wired or wireless communication link(s). A further example of a computing device is described with respect to FIG. 5 below.

In one example, processor 204 can be a microprocessor, a digital signal processor, a state machine, or the like, which processes first data 220 and second data 222 received from a validated data source and unvalidated data source respectively, while under control of underlying firmware, software, or both. In another example, processor 204 can be part of a computer system, as would be apparent to a skilled artisan. Alternatively or additionally, additional hardware components can be used to perform one or more of the operations discussed below.

In an embodiment, first data 220 can be a data signal received from a validated data source, such as a cesium atomic clock or in more general terms an atomic clock. As discussed previously, the actual time-reference of an atomic clock includes an electronic oscillator operating at microwave frequency and atomic clocks are utilized as validated source, because such clocks provide the most accurate time and frequency standards known and serve as the primary standard for the definition of the atomic second. In another embodiment, second data 222 can be a data signal received from a distributed coordinated time source, such as GPS or another type of GNSS. Such time distribute coordinated time sources are vulnerable to attacks from hackers who may attempt to modify or spoof the timing signal, An alteration or spoofing of a timing signal from a GNSS could result in a compromised system which is not operating as intended. First data 220 and second data 222 are received by processor 204, which is configured to analyze characteristics of the respective inputs via timing comparator 206 and clock module 208. In an embodiment, timing comparator 206 is configured to compare the processed first data with the processed second data for an adjustable interval of time to determine a threat detection value. A threat detection value is utilized to determine if there is a discrepancy or anomaly in the timing or frequency of either the validated data source or the unvalidated data source.

In an embodiment, clock module 208 is configured to initiate one or more counters. For example, clock module 208 can be configured to initiate a cycle counter. The cycle counter is configured to count the quantity of cycles of first data 220 received from the validated source during the adjustable interval of time. For example, the adjustable interval of time can be configured to be one second intervals defined by second data 222. During continuous one second intervals, timing comparator 206 is configured to count the quantity of timing pulses generated by the validated time source. In other words, timing comparator 206 is configured to count the number of cycles of first data 220. Timing comparator 206 is configured to analyze second data 222 in order to detect a pulse per second (PPS) received from the unvalidated receiver source. The cycle counter initiated by clock module 208 is subsequently configured to latch to a leading or rising edge of the detected PPS of second data 222. In this manner, clock module 208 is configured to register and record a count of the number of cycles received from the validated data source prior to each time a PPS is detected from the invalidated data source. For each interval, the initiated cycle counter is reset to 0 and a new count is initiated.

Timing comparator 206 is configured to compute a threat detection value based on a comparison between the determined quantity of cycles received during an interval of time and a predetermined expected clock cycle value. For example, when the validated data source and the unvalidated data source are completely in sync with respect to time, the number of clock cycles from the validated data source during an interval of time can be measured. The measurement serves as the baseline for the entire system, as this is an indication of an ideal operating state of the system. The baseline measurement is used as the predetermined expected clock cycle value, according to embodiments. In an embodiment, the threat detection value can be analyzed using different algorithms in order to detect an anomaly (e.g., a delay lock loop, kalman filter, etc). For example, a kalman filter, also known as linear quadratic estimation (LQE) algorithm can be used. A kalman filter uses a series of measurements observed over time, containing noise (random variations) and other inaccuracies, and produces estimates of unknown variables that tend to be more precise than those based on a single measurement alone. In embodiment, the kalman filter can operate recursively on streams of noisy input data to produce a statistically optimal estimate of the underlying system state.

Any abnormality or deviation from the baseline measurement or expected clock cycle value serves as a flag to the system indicating a possible threat. Such a threat most likely means that the timing signals associated with second data 222 are inaccurate. According to an embodiment, timing comparator 206 is configured to compute a delta associated with the difference between a determined quantity of cycles of first data 220 and the predetermined expected clock cycle value. The absolute value of the delta is then assigned to the threat detection value, according to embodiments. In an embodiment, timing comparator 206 is configured to compare the threat detection value to a configurable threat detection threshold. Such a comparison and threshold is utilized to determine to what extent the validated data source and unvalidated data source are out of sync with respect to timing. If the threat detection value meets or exceeds the configurable threat detection threshold, processor 204 generate an alert message which is sent to output device 210 for display to a network operator. The alert message can include the threat detection value, which would indicate the level of disparity between the timing signals of the respective first data 220 and second data 222. In this way, a network operator is provided real-time data regarding the timing characteristics of a system and is immediately alerted to discrepancies or timing anomalies, which may serve as an indicator of a compromised GPS receiver. The network operator may then analyze the extent of the anomaly and provide real-time network protection services. According to embodiments, multiple unvalidated timing sources (e.g. GPS & GLONASS receiver) and multiple independent validated timing references (e.g. one or more cesium clocks, Two-way Time Satellite Transfer (TWSTT) system) can be coupled together to increase the robustness of the system (e.g. redundant sources, cross-checking, independent sources).

According to another embodiment, clock module 108 is configured to initiate both a cycle counter and an interval counter. While the cycle counter would operate in a similar manner, as described above, the interval counter would be configured to record a duration of time up to a predetermined interval threshold. In this way, timing error measuring unit 110 can be configured to arbitrarily count and report the number of cycles received from first data 220 for a predetermined amount of time. When the count of the interval counter exceeds the predetermined interval threshold, timing comparator 206 is configured to receive the count generated by cycle counter and perform similar timing analysis and detection, as described above. Thus, embodiments allow for continuous checking and validation of timing signals.

Overview of the Method

Figure 3:
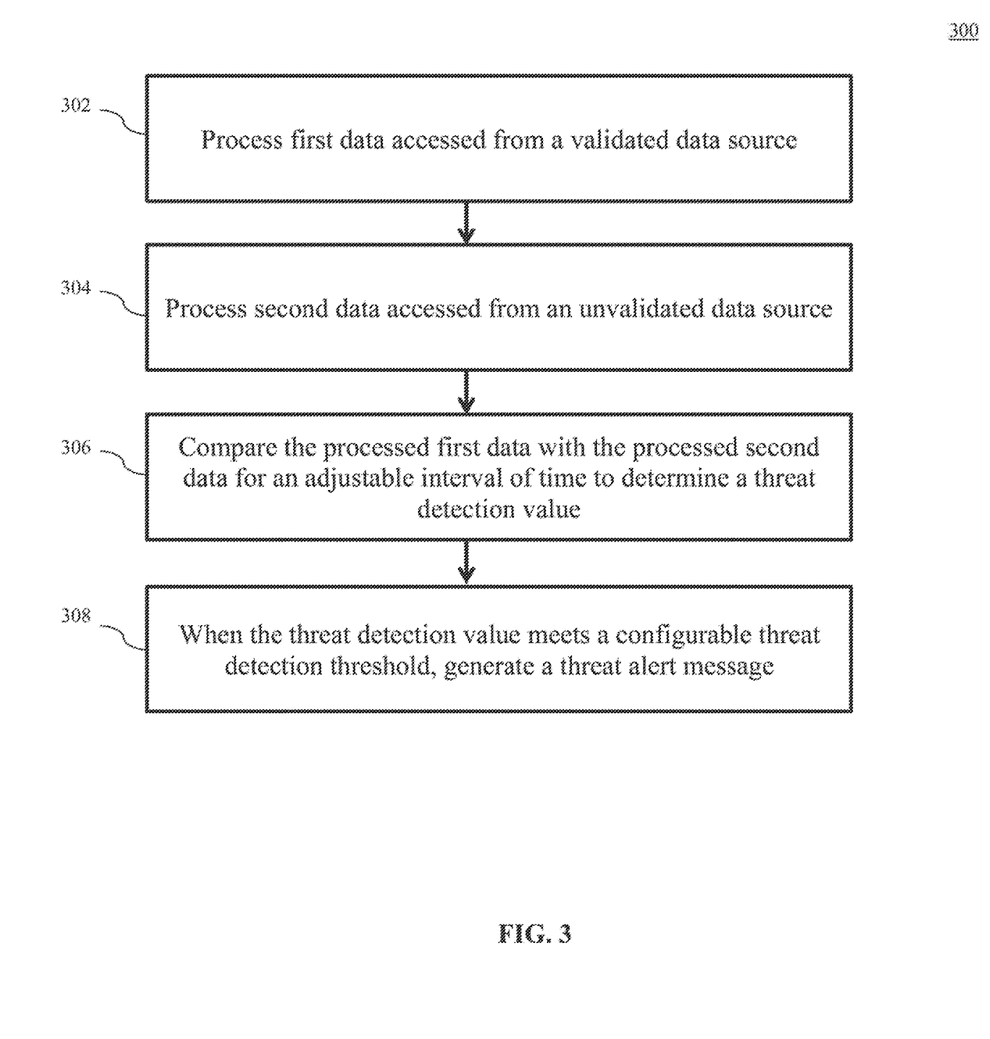
FIG. 3 is a flowchart illustrating a process for a timing analysis detection system, according to an example embodiment.

FIG. 3 is a flowchart illustrating a process for a timing anomaly detection system, according to an example embodiment.

At step 302, first data is processed from a validated data source. For example, step 302 may be performed by timing error measuring unit 110 of timing anomaly detection system 100. In an embodiment, first data can be a data signal received from a validated data source, such as a cesium clock.

At step 304, second data is processed from an unvalidated data source. For example step 304 may be performed by timing error measuring unit 110 of timing anomaly detection system 100. According to an embodiment, the unvalidated data source is a distributed coordinated time source, such as a GPS which generates the second data. A GPS can include a GPS receiver that measures the relative time delay of signals from a plurality of GPS satellites, which each include onboard cesium atomic clocks. The relative times are transformed into absolute spatial coordinates and a time coordinate.

At step 306, the processed first data is compared with the processed second data for an adjustable interval of time to determine a threat detection value. For example, step 306 may be performed by time comparator 206 in conjunction with clock module 208 of timing error measuring unit 110. A threat detection value is utilized as a flag or indicator to determine if there is a discrepancy or anomaly in the timing or frequency of either the validated data source or the unvalidated data source. A cycle counter may be initiated which counts the amount of cycles received from the validated source during the adjustable interval of time, according to an embodiment. For each interval of time, a measurement of the number of timing pulses generated by the validated data source is recorded. In an embodiment, the initiated clock is latched to a PPS of the unvalidated data source which in turn can be used to determine an interval of time for measurement of timing pulses received from the validate data source. The threat detection value is computed based on a relationship between the determined number of pulses received during an interval of time and a predetermined expected clock cycle value. The predetermined expected clock cycle value serves as the baseline for the system when operating without any timing anomalies. A deviation from the expected clock cycle would generate a delta which would serve as an indication that there is an anomaly in the timing of either the validated data source or the unvalidated data source.

At step 308, when the threat detection value meets a configurable threat detection threshold, a threat alert message is generated. The threat alert message identifies an anomaly in either the validated source or the unvalidated receiver source. For example, step 308 may be performed by processor 204 of timing error measuring unit 110. In an embodiment, the threat detection value is compared with a configurable threat detection threshold. Such a comparison is utilized to determine to what extent the respective timing signals of the validated data source and unvalidated data source are not synchronized. For example, the configurable threat detection threshold can be set to a predetermined constant. Therefore any threat detection value that meets or exceeds the threat detection value constant, would set a flag that indicates there is a significant disparity between the two data sources. When this occurs, a threat alert message including the threat detection values is generated and sent to a network operator. In this way, an operator is provided real-time information regarding the timing characteristics of the unvalidated data source and can immediately detect timing anomalies, which may compromise the system or network.

Figure 4:
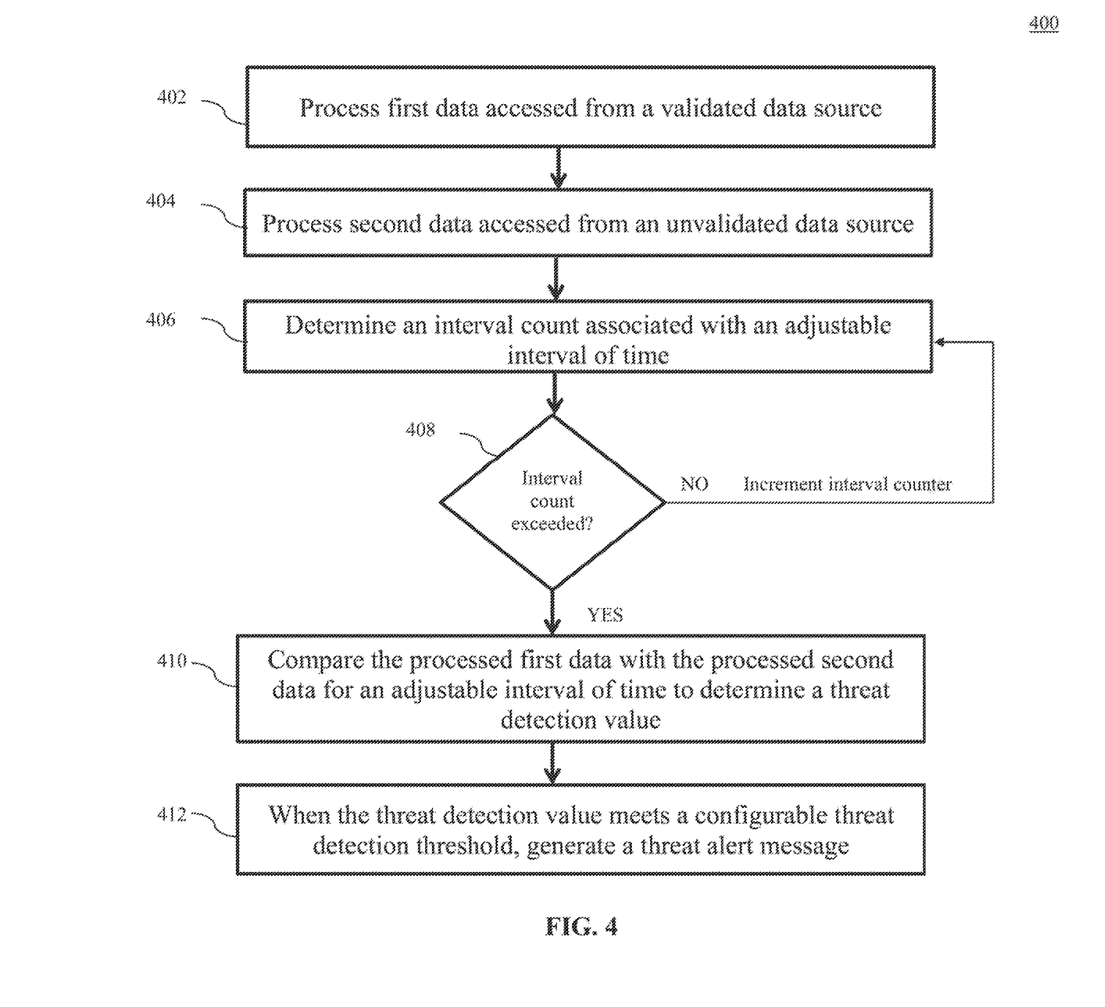
FIG. 4 is another flowchart illustrating a process for a timing analysis detection system, according to an example embodiment.

FIG. 4 is a flowchart illustrating a process for a timing anomaly detection system, according to an example embodiment.

At step 402, first data is processed from a validated data source. For example, step 402 may be performed by timing error measuring unit 110 of timing anomaly detection system 100. Similar to step 302, describe above, first data can be a data signal received from a validated data source, such as an cesium atomic clock. At step 404, second data is processed from an unvalidated data source. For example step 404 may be performed by timing error measuring unit 110 of timing anomaly detection system 100. Step 404 operates in a similar manner as step 304 described above.

At step 406, an interval count associated with an adjustable interval of time is determined. For example, step 404 may be performed by timing error measuring unit 110 of timing anomaly detection system 100. In an embodiment, an interval counter can be initiated to record an interval count which represents a duration of time up to a predetermined interval threshold. The predetermined interval threshold can be set by a network operator, for example, based on a type of threat the network operator is trying to detect. For example, a network operator may be aware of certain types of network attacks and how such attacks may affect timing during a specific interval of time. Thus, the network operator can set the interval threshold based on such known threat characteristics. In this way, the timing error measuring unit can be configured to arbitrarily count and report the number of cycles received from a first data for a predetermined amount of time up the predetermined interval threshold.

At step 408, it is determined whether the count of the interval counter exceeds the predetermined interval threshold. For example, step 408 may be performed by timing error measuring unit 110 of timing anomaly detection system 100. When the count of the interval counter exceeds the predetermined interval threshold, method 400 proceeds to step 410. When the count of the interval counter does not exceed the predetermined interval threshold, the interval counter is incremented and step 406 is repeated while the number of timing pulses generated by first data are continuously counted by a separate cycle counter, as described in step 306 of FIG. 3 above.

At step 410 the processed first data is compared with the processed second data to determine a threat detection value. For example, step 410 may be performed by timing comparator 206 of timing error measuring unit 110. Step 410 operates in a similar manner as step 306 described above.

At step 412, when the threat detection value meets a configurable threat detection threshold, a threat alert message is generated. For example, step 412 may be performed by processor 204 of timing error measuring unit 110. Step 412 operates in a similar manner as step 308 described above.

Example Computer System

Various embodiments can be implemented, for example, using one or more well-known computer systems, such as computer system 500 shown in FIG. 4. Computer system 500 can be any well-known computer capable of performing the functions described herein, such as computers available from International Business Machines, Apple, Sun, HP, Dell, Sony, Toshiba, etc.

Figure 5:
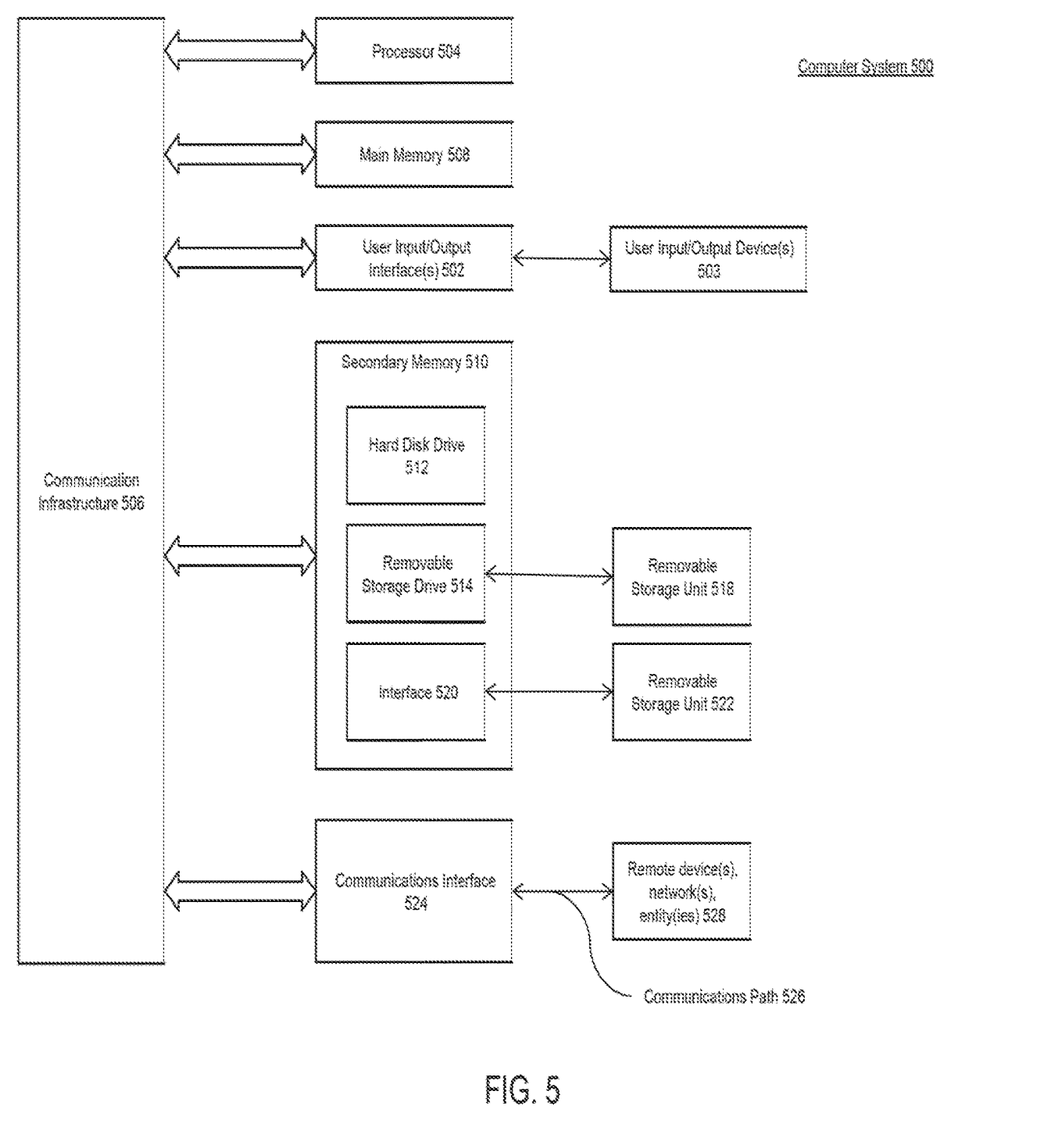
FIG. 5 is an example computer system useful for implementing various embodiments.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired, and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A timing analysis detection system, comprising:
   an independent clock source;
   a GPS receiver; and
   a timing error measuring unit configured to:
   process first timing data accessed from the independent clock source;
   process second timing data accessed from the GPS receiver;
   analyze the processed first timing data and the processed second timing data for an adjustable interval of time to determine a threat detection value, wherein to analyze, the timing error measurement unit is further configured to:
   receive, from the GPS receiver, a pulse per second timing signal;
   receive, from the independent clock source, timing pulses; and
   initiate a cycle counter to track a number of the timing pulses during the adjustable interval of time; and
   determine the threat detection value based on comparing the number of the timing pulses to a predetermined expected number of cycles.

2. The timing analysis detection system of claim 1, further comprising:
   a GPS antenna;
   wherein the GPS receiver is configured to:
   receive a plurality of signals from the GPS antenna;
   measure a relative time delay of the plurality of signals; and
   transform the relative time delay into an absolute spatial coordinate and a time coordinate.

3. The timing analysis detection system of claim 1, further comprising:
   a frequency multiplier, wherein the frequency multiplier is configured to:
   receive, from the independent clock source, a timing signal; and
   multiply the timing signal by a constant to generate an updated timing signal; and
   transmit the updated timing signal to the timing error measuring unit.

4. The timing analysis detection system of claim 1, wherein the independent clock source comprises an electronic oscillator operating at a microwave frequency and wherein the electronic oscillator comprises a frequency-determining component that is controllable via a feedback signal.

5. The timing analysis detection system of claim 4, wherein the feedback signal is configured to maintain the electronic oscillator in tune with a frequency of an electronic transition of cesium.

6. The timing analysis detection system of claim 1, wherein the adjustable interval of time is defined by consecutive leading edges of the received pulse per second timing signal.

7. The timing analysis detection system of claim 1, wherein the timing error measuring unit is further configured to generate a threat alert message when the threat detection value meets a configurable threat detection threshold, wherein the threat alert message identifies an anomaly in either the independent clock source or the GPS receiver.

8. The timing analysis detection system of claim 1, wherein the timing error measuring unit is further configured to:
   reset the cycle counter when the pulse per second (PPS) is detected from the GPS receiver.

9. The timing analysis detection system of claim 1, wherein the timing error measuring unit is further configured to:
   determine that the threat detection value is within a statistical noise range based on a threat detection threshold; and
   responsive to the threat detection value being outside the statistical noise range, send a threat alert message including the threat detection value to an output device of a network operator.

10. The timing analysis detection system of claim 1, wherein the timing error measuring unit further comprises:
    a clock module configured to perform the initiating the cycle counter; and
    a timing comparator configured to perform the determining the threat detection value.

11. A method comprising:
    processing first timing data accessed from an independent clock source;
    processing second timing data accessed from a GPS receiver;
    analyzing the processed first timing data and the processed second timing data for an adjustable interval of time to determine a threat detection value, wherein the analyzing comprises:
    receiving, from the GPS receiver, a pulse per second timing signal;
    receiving, from the independent clock source, timing pulses; and
    initiating a cycle counter to track a number of the timing pulses during the adjustable interval of time; and
    determining the threat detection value based on comparing the number of the timing pulses to a predetermined expected number of cycles.

12. The method of claim 11, further comprising:
    receiving, by the GPS receiver, a plurality of signals from a GPS antenna;
    measuring, by the GPS receiver, a relative time delay of the plurality of signals; and
    transforming, by the GPS receiver, the relative time delay into an absolute spatial coordinate and a time coordinate.

13. The method of claim 11, further comprising:
    receiving, by a frequency multiplier from the independent clock source, a timing signal; and
    multiply, by the frequency multiplier, the timing signal by a constant to generate an updated timing signal; and
    transmitting, by the frequency multiplier, the updated timing signal.

14. The method of claim 11, wherein comparing the number of the timing pulses to the predetermined expected number of cycles comprises:
    determining a delta between the number of the timing pulses and the predetermined expected number of cycles; and
    assigning an absolute value of the delta to the threat detection value.

15. The method of claim 11, further comprising:
    determining if the threat detection value is within a statistical noise range based on a threat detection threshold; and responsive to the threat detection value being outside the statistical noise range, sending a threat alert message including the threat detection value to an output device of a network operator.

16. A non-transitory computer-readable device having instructions stored thereon that, when executed by at least one computing device, cause the at least one computing device to perform operations comprising:

processing first timing data accessed from an independent clock source;

processing second timing data accessed from a GPS receiver;

analyzing the processed first timing data and the processed second timing data for an adjustable interval of time to determine a threat detection value, wherein the analyzing comprises:

receiving, from the GPS receiver, a pulse per second timing signal;

receiving, from the independent clock source, timing pulses; and initiating a cycle counter to track a number of the timing pulses during the adjustable interval of time; and determining the threat detection value based on comparing the number of the timing pulses to a predetermined expected number of cycles.

17. The non-transitory computer-readable device of claim 16, the operations further comprising:

receiving a plurality of signals from a GPS antenna;

measuring a relative time delay of the plurality of signals; and transforming the relative time delay into an absolute spatial coordinate and a time coordinate.

18. The non-transitory computer-readable device of claim 16, the operations further comprising:

receiving, from the independent clock source, a timing signal; and multiplying the timing signal by a constant to generate an updated timing signal; and transmitting the updated timing signal to a timing error measuring unit.

19. The non-transitory computer-readable device of claim 16, wherein comparing the number of the timing pulses to the predetermined expected number of cycles comprises:

determining a delta between the number of the timing pulses and the predetermined expected number of cycles; and assigning an absolute value of the delta to the threat detection value.

20. The non-transitory computer-readable device of claim 16, the operations further comprising:

determining if the threat detection value is within a statistical noise range based on a threat detection threshold; and responsive to the threat detection value being outside the statistical noise range, sending a threat alert message including the threat detection value to an output device of a network operator.

* * * * *